(12) United States Patent
Hosnedl et al.

(10) Patent No.: US 7,325,722 B2
(45) Date of Patent: Feb. 5, 2008

(54) METHOD AND DEVICE FOR RECHARGING A CREDIT TO CHIP CARDS

(75) Inventors: Jiri Hosnedl, Praha (CZ); Jiri Meixner, Praha (CZ)

(73) Assignee: SAZKA, a.s., Prague (CZ)

( * ) Notice: Subject to any disclaimer, the term of this patent is extended or adjusted under 35 U.S.C. 154(b) by 109 days.

(21) Appl. No.: 10/505,732

(22) PCT Filed: Mar. 17, 2003

(86) PCT No.: PCT/CZ03/00021

§ 371 (c)(1),
(2), (4) Date: Oct. 4, 2005

(87) PCT Pub. No.: WO03/083791

PCT Pub. Date: Oct. 9, 2003

(65) Prior Publication Data

US 2006/0081699 A1    Apr. 20, 2006

(30) Foreign Application Priority Data

Mar. 29, 2002    (CZ) .................................. 2002-1130

(51) Int. Cl.
*G06K 5/00* (2006.01)
(52) U.S. Cl. ....................... 235/380; 235/375; 235/487

(58) Field of Classification Search ................ 235/375, 235/380, 382, 382.5, 487
See application file for complete search history.

(56) References Cited

U.S. PATENT DOCUMENTS 6,000,608 A    12/1999   Dorf

*Primary Examiner*—Karl D. Frech
(74) *Attorney, Agent, or Firm*—Birch, Stewart, Kolasch & Birch, LLP

(57) ABSTRACT

A method for recharging chip cards, the recharging being made from a terminal which is connectable to a service center for recharging the chip card. During the process either data are filled in a filling-in coupon or the data are gained by reading a bar code in combination with a manual input. The data contain at least the identification number of the chip card to be recharged and a sum by which the chip card should be credited. Then the correctness of the filed data is executed either directly in the terminal or the terminal is connected to a datacenter where the checking of the meaningfulness of the filed data is executed. If the checking has a positive result, the value corresponding with the desired sum is transferred to the chip card or an account associated by means of the identification number with the card is increased by the mentioned value. A device for executing the recharging of chip cards consisting of a terminal connectable to a datacenter, the datacenter containing a database of chip cards identification numbers.

8 Claims, 2 Drawing Sheets

METHOD AND DEVICE FOR RECHARGING A CREDIT TO CHIP CARDS

FIELD OF THE INVENTION

This invention relates to a method for recharging of a credit to a customer account, particularly into the chip cards, typically into the SIM-cards of prepaid services of the mobile telephone net operators.

BACKGROUND OF THE INVENTION

At present, there are several methods and devices for recharging of credit into the chip cards of prepaid services, most often used in the field of the mobile telephone services.

The most frequently used method of credit recharging into chip cards, the so called SIM-cards of telephone operators, is the recharging by means of the recharging telephone coupons of a certain value, which coupons can be purchased by a customer at a coupons vendor. The recharging coupon then contains a code under a wipe-off field, by which code it is then possible to replenish—"to recharge"—the telephone charge credit, which amount recharged into the telephone SIM-card corresponds with the coupon value. However, this method exhibits a number of disadvantages. On the one hand, the whole recharging process is rather complicated and requires attention of the person processing the credit recharging. That can be very problematic particularly for persons of age or for persons having no experience with such operations. On the other hand, to obtain the necessary recharging coupon can also be a problem, especially in the evening or during legal holidays. Last but not least, the whole process is rather costly because it is necessary to produce the recharging coupons and then organize their distribution in a vendors network before the customer can purchase them. A not unsubstantial risk is also that the recharging coupons can be stolen during their distribution or at the vendors.

Such a system of recharging is disclosed for example in the specification no. CZ 288 688, according to which specification the customer desiring to recharge the telephone charge credit of his SIM-card purchases a telephone subscription card containing a hidden code, which code is then sent by the customer's telephone into the service center, which service center then checks in a database whether the code is valid, whereupon, the service center sends a short text message containing the money value of the recharging coupon into an auxiliary memory, from which memory the SIM-card is then recharged. The code which has been used for recharging the card is then deleted in the database. A similar system is disclosed also in the document no. WO 00/33264.

Another system, which partly removes the above mentioned insufficiencies, is disclosed in the document no. WO 01/75816. This documents discloses a method for recharging of SIM-cards by means of an automated teller machine, a ticket selling terminal or a similar POS-terminal, in which terminal the SIM-card credit is recharged from a payment card of a customer interested in recharging or by means of money directly put into the terminal or otherwise put into the terminal. This method removes necessity of the recharging coupons existence but brings about a significant disadvantage because the customer requiring to replenish the credit has to execute this step in a public place and so a customer is endangered in the same way as when withdrawing money from an automated teller machine, when he can be either robbed or his payment card can be misused. A further disadvantage is that in the moment when the customer deals with the respective terminal for executing the credit recharging, he can be stressed due to the shortage of time caused by other customers queuing at this terminal, etc. A further disadvantage is that when for some reason the transaction has not been not executed, the customer who tried a credit recharging is not sure that the recharging sum was not drawn from his payment card after all.

Document WO 01/09853 discloses a method of credit recharging into the chip cards, which method is carried out via a terminal connected to a service center for chip card recharging, whereby, data is obtained either by reading a bar code or a magnetic code in combination with manual input entry, whereby, said data comprises at least an identification number of the chip card, the battery of which is to be recharged and the amount required for charging a credit into the chip card, whereupon, data is checked with regard to its correctness and the terminal is connected to a data center, where meaningfulness of the request is assessed and in case the result is positive an amount corresponding to the amount confirmed is credited to the account allocated to the card by means of an identification number. With regard to the consumption of time and security this solution exhibits the same disadvantages as those mentioned above.

It is an object of the invention to provide such a method of recharging chip cards, which method is convenient with regard to time, allows a certain possibility of choice to an interested person and makes him sure about spending of the recharged amount.

SUMMARY OF THE INVENTION

The invention provides a method for recharging of chip cards, in which method the recharging is executed from a terminal, which terminal is connected with a service center for chip card recharging, and in which method input data are loaded into the terminal, which input data comprise at least the identification number of the recharged chip card and the amount to be recharged to the credit of the chip card, the loaded input data are checked with regard to their correctness, when the terminal is connected with the service center an assessment of meaningfulness of the requirement to recharge the chip card is carried out, and in case of a positive evaluation of said check, the value corresponding the amount loaded into the chip card is transferred, eventually, the account associated with the card by means of an identification number is increased by this amount. The method consists in that the input data are loaded by incremental crossing of frames in the respective part of a fill-in coupon, which part corresponds to the respective input datum, the terminal is connected with the first service center, where detection of a requirement for recharging of a chip card is carried out and the requirement is registered, whereupon, the first service center is connected with a second service center, in which second service center meaningfulness assessment of the requirement for recharging of a chip card is carried out, whereby after a positive meaningfulness assessment of the requirement for recharging a unique code is allocated to the requirement and a report is sent from the second service center to the first service center, by which report it is confirmed that the requirement is realizable, whereupon, the requirement is queued into a queue of waiting requirements in the first service center for a preset time period, during which time period the first service center finds out whether a cancellation of the requirement has not been sent from the terminal, whereupon, after elapse of said preset time period, if there was not a cancellation sent via the terminal, the second service center issues an instruction to transfer the value into the chip card and sends a text message about recharging to the identification number of the chip card, whereby, the length of the waiting queue is set by characteristics, while in case of a negative meaningfulness assessment of the requirement for recharging the second service center issues an instruction to cancel the whole transaction.

Correctness of completing the fill-in coupon is verified in a terminal or in the second service station in connection with meaningfulness assessment of the requirement to recharge the chip card.

According to a preferable embodiment of the method of recharging, the chip card telephone number is loaded as the identification number in the nets of mobile telephone operators.

The identification number loaded as the chip card telephone number is completed in the fill-in coupon by incremental crossing of numbers in a matrix of numbers having 10 lines and n columns or n lines and 10 columns, where n is chosen according to the required length of the telephone number of the recharged chip card.

Further, an identification of the telephone services operator, for whose net the chip card was issued, is preferably marked in the fill-in coupon. This identification can be carried out already by the telephone number of the recharged chip card itself.

Preferably, in the fill-in coupon data about confirmation number are also marked, to which number a confirmation about carrying out the recharging to the chip card identification number is sent from the second service station after transferring the value corresponding to the value of the deposited amount.

After transferring the value corresponding to the value of the loaded amount the terminal prints a receipt about positive settlement of the requirement.

In case of a negative meaningfulness assessment of the requirement or in case of cancellation of the requirement during its waiting in the queue for a predetermined time a receipt about non-carrying out of the requirement is printed.

It is an advantage of the method according to the invention that it allows to a customer interested in recharging the credit to prepare the fill-in coupon at rest and in advance and it is not necessary to issue usual recharging coupons having already a predetermined value. Thereby, danger of theft is decreased because the fill-in coupons in reality do not have any value. Money can then be transferred at rest at places where the risk of theft is substantially lower than as it is for example at the automated teller machines. Further, customer has certainty that the transaction carried out has really been carried out and that in case it could not be carried out he obtains his money back immediately. Another non-negligible advantage is the possibility to keep back the filled in recharging coupon and to use it again in the next recharging or eventually many times. During the queuing time after inclusion of the requirement in the queue of the waiting requirements, customer has the possibility to modify his original request for recharging or to cancel it, whereby, he obtains a printed receipt about this step or eventually also about the recharging.

BRIEF DESCRIPTION OF THE DRAWINGS

The invention will now be described illustratively by explaining some examples of embodiments, whereby.

EXAMPLES OF EMBODIMENTS OF THE INVENTION

According to an example of embodiment of the method according to the invention, this invention discloses a method for recharging of chip cards for mobile telephones, the so called SIM-cards, which SIM-cards operate on the bases of subscribed services. The chip card works always in the net of that operator who issued it. Therefore, it can be recharged via the service center of this operator.

Figure 3:
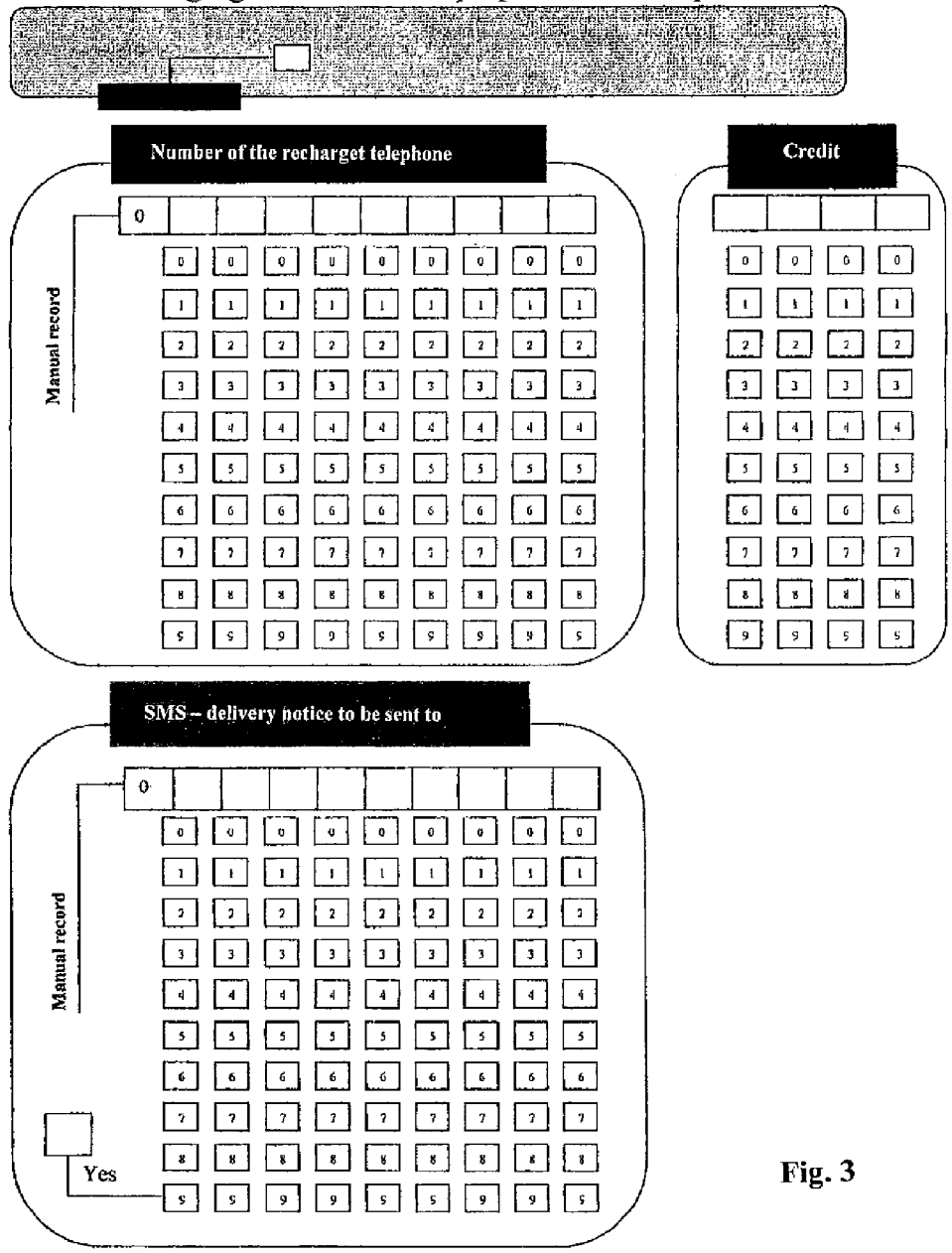

In carrying out this method a form for recharging, the so called fill-in coupon, is filled in at first. FIG. 3 shows an example of such fill-in coupon. Such a fill-in coupon is formed by a matrix of frames containing numbers from 0 to 9. In this example of embodiment, the fill-in coupon comprises a matrix for the recharged telephone number, a credit matrix and a confirmation number matrix for sending a short message receipt. The recharged telephone number matrix comprises, in accordance with the present format of the telephone numbers, ten lines and nine columns but the matrix can be modified to meet requirements of the telephone operators so that it comprises 10 lines and n columns or n lines and 10 columns. By crossing the respective frames, the identification number of the card, in this case the telephone number allocated to the chip card (SIM card), is filled in the matrix. A part of the telephone number can be also the operator's identification or the operator can be filed in by another appropriate method, e.g. by crossing a respective predetermined frame in the fill-in coupon. It is also possible to use a fill-in coupon valid only for a given operator. Further, an amount to be charged to the credit in the chip card is filled in. This filling in can be again carried out by crossing the respective frames, corresponding to the required amount for recharging, in the credit matrix. Nevertheless, this can be done for example also by crossing the frame placed next to the predetermined amount. Further, data about the confirmation number are marked in the fill-in coupon. To this confirmation number a confirmation about recharging to the identification number of the given chip card being carried out is sent after transmitting of the value corresponding to the loaded amount. This record is again carried out by crossing the respective frames in a matrix in the given case.

The terminal used for recharging of the chip card can be both an attended terminal, used e.g. for receiving bets, and any suitable non-attended terminal making possible receiving and reading of the filled-in coupon and the subsequent receiving of the amount for recharging of the credit on the card. In this case, recharging with the aid of an attended terminal will be described, i.e. of a terminal attended by a trained person, not by the customer requiring the recharging.

In case a request for recharging is received, the terminal establishes a connection to the service center, i.e. a data center, by means of which data center it is assessed on the one hand whether it is meaningful to execute the demand and on the other hand the recharging itself will be executed through this data center. Therefore, when assessing the meaningfulness at first it is checked whether the loaded telephone number is a really valid telephone number of the respective operator which number can be recharged by the requested credit. Further, it is found out what amount should be credited to this chip card.

If there is a requirement to recharge a chip card, the person having this request fills in the fill-in coupon by using the frame crossing method in specifying the numbers. The attendant inserts the filled in coupon into the terminal, whereby, it is preferable to carry out a check of the filling out correctness before inserting, i.e. that no more than one frame is crossed in one line, etc., which check simplifies the meaningfulness assessment of the request. Of course, such check in the terminal is not intended to be a duplicity or substitution of the meaningfulness assessment carried out in the service center. This is used only in order to eliminate formal errors. However, such errors can also be assessed in relation with the meaningfulness assessment in the data center.

Figure 1:
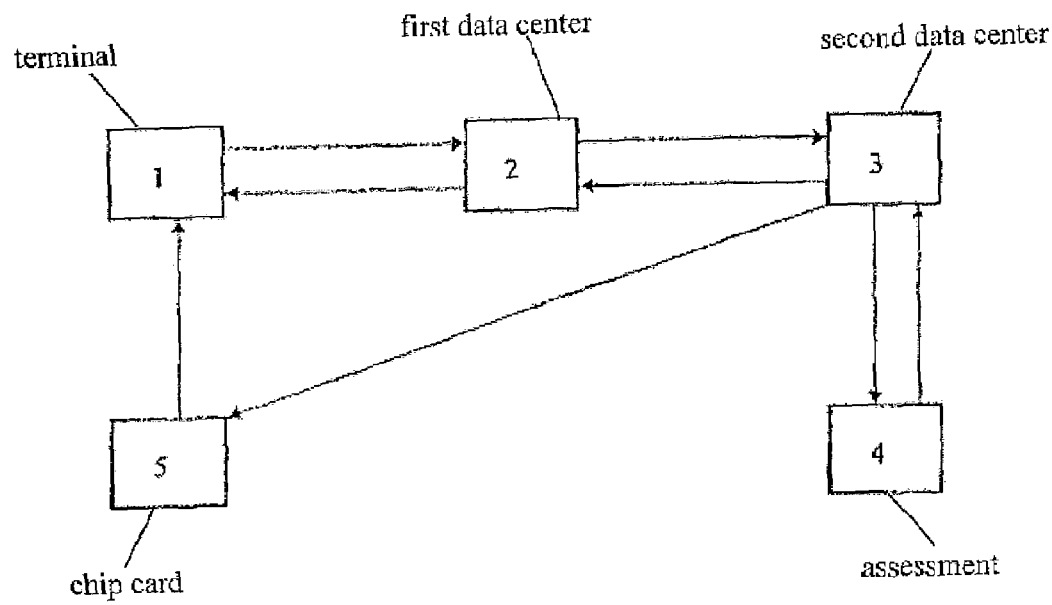
FIG. 1 is a schematic diagram of the method for recharging.

So as it is shown in FIG. 1, having received a request to recharge a chip card 5, at first, the terminal 1 establishes a connection with the first data center 2, for example with a service center of the terminal 1 net operator, which net is used also for other purposes than for the chip card 5 recharging. In the first data center 2, it is evaluated that it is a request for recharging of a chip card 5 at first. Then, this request is registered in the first center 2, whereupon, the first data center 2 establishes a connection with a second data center 3, which second data center 3 is preferably a service center of the given provider, i.e. the net operator of the chip card 5, who is requested to recharge the credit. The second data center 3 carries out an assessment 4 whether the request to recharge the credit is meaningful, i.e. whether the telephone number of the chip card 5, for which recharging is requested, is valid and whether the credit can be credited to the chip card 5. Having done this assessment 4 the chip card 5 can be recharged directly. The other data center 3 sends a short text message to the chip card 5 informing about recharging the credit.

Figure 2:
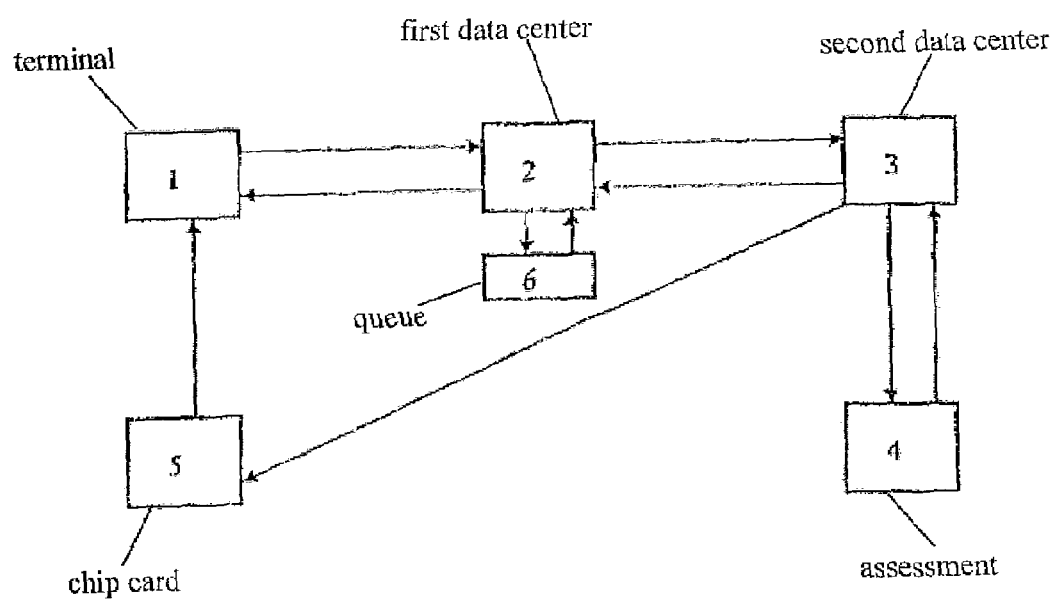
FIG. 2 is a Schematic diagram of the method for recharging according to the invention and FIG. 3 is a schematic drawing of an example of embodiment of the fill-in coupon used in the method according to the invention.

As it is shown in FIG. 2, it is substantial for the method according to the invention that after a positive assessment of the meaningfulness of the request, in the second data center 3, a unique internal code is allocated to this request and a message about the meaningfulness approval is sent to the first data center 2, which first data center 2 queues this request into the waiting queue 6 of requests for a predetermined time period. During this waiting time period of the waiting queue 6 the customer is allowed to cancel the transaction via the first terminal 1. Length of this waiting time period in the queue 6 can be set by characteristics. After elapse of this time period, if there is no cancellation, the second data center 3 carries out recharging of the credit on the chip card 5 via a telephone number specified in the beginning. The second data center 3 sends a short text message about this step to the respective telephone number. After transferring of the value corresponding to the amount deposited the terminal 1 can print a receipt about positive settlement of the request.

In case of a negative meaningfulness assessment of the request for recharging, the second service center 3 issues an instruction to cancel the whole transaction. If the fill-in coupon comprises also a confirmation number where to send the report about recharging a short text message is sent also to this number. In case the recharging was not carried out, both because of negative meaningfulness assessment of the request and because cancellation of the request during its waiting in the waiting queue for a predetermined time period, it is possible to send a message to the terminal 1 and to print a receipt there about negative carrying out of this request.

INDUSTRIAL USE

The invention is especially advantageous for recharging of the chip SIM-cards of mobile telephones operating on the basis of prepaid services of mobile operators. Nevertheless, it can be used anywhere where the chip cards containing a credit are used for providing any services and where it is necessary to recharge the chip cards.

The invention claimed is:

1. A method for recharging of chip cards, in which method the recharging is executed from a terminal, which terminal is connected with a service center for chip card recharging, and in which method input data are loaded into the terminal, which input data comprise at least the identification number of the recharged chip card and the amount to be recharged to the credit of the chip chip; the loaded input data are checked with regard to their correctness, and when the terminal is connected with the service center an assessment of meaningfulness of the requirement to recharge the chip card is carried out, and in the case of a positive evaluation of said check, the value corresponding to the amount loaded into the chip card is transferred, and eventually, the account associated with the card by means of an identification number is increased by this amount, wherein the input data are loaded by incremental crossing of frames in the respective part of a fill-in coupon, which part corresponds to the respective input datum; the terminal is connected with the first service center, where detection of a requirement for recharging of a chip card is carried out and the requirement is registered, whereupon, the first service center is connected with a second service center, in which second service center meaningful assessment of the requirement for recharging of a chip card is carried out, whereby after a positive meaningful assessment of the requirement for recharging, a unique code is allocated to the requirement and a report is sent from the second service center to the first service center, by which report it is confirmed that the requirement is realizable, whereupon, the requirement is queued into a queue of waiting requirements in the first service center for a preset time period, during which time period the first service center determines whether a cancellation of the requirement has not been sent from the terminal, whereupon, after elapse of said preset time period, if there was not a cancellation sent via the terminal, the second service center issues an instruction to transfer the value into the chip card and sends a text message about recharging to the identification number of the chip card, whereby, the length of the waiting queue is set by characteristics, while in the case of a negative meaningful assessment of the requirement for recharging, the second service center issues an instruction to cancel the whole transaction.

2. The method according to claim 1, wherein correctness of completing the fill-in coupon is verified in a terminal or in the second service station in connection with meaningful assessment of the requirement to recharge the chip card.

3. The method according to claim 1, wherein the chip card telephone number is loaded as the identification number.

4. The method according to claim 3, wherein the identification number loaded as the chip card telephone number is completed in the fill-in coupon by incremental crossing of numbers in a matrix of numbers having 10 lines and n columns or n lines and 10 columns, where n is chosen according to the required length of the telephone number of the recharged chip card.

5. The method according to claim 1, wherein an identification of the telephone services operator is marked in the fill-in coupon.

6. The method according to claim 1, wherein in the fill-in coupon the data about confirmation number are marked, to which number a confirmation about carrying out the recharging to the chip card identification number is sent from the second service station after transferring the value corresponding to the value of the deposited amount.

7. The method according to claim 1, wherein after transferring the value corresponding to the value of the loaded amount, the terminal prints a receipt about positive settlement of the requirement.

8. The method according to claim 1, wherein in the case of a negative meaningful assessment of the requirement or in the case of cancellation of the requirement during its waiting in the queue for a predetermined time, a receipt about non-carrying out of the requirement is printed.

* * * * *